US008723983B2

(12) United States Patent
Shiohara

(10) Patent No.: US 8,723,983 B2
(45) Date of Patent: May 13, 2014

(54) IMAGE CORRECTION CIRCUIT, IMAGE CAPTURE DEVICE, IMAGE CORRECTION METHOD, AND IMAGE CORRECTION PROGRAM

(75) Inventor: Ryuichi Shiohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 13/239,772

(22) Filed: Sep. 22, 2011

(65) Prior Publication Data

US 2012/0069214 A1    Mar. 22, 2012

(30) Foreign Application Priority Data

Sep. 22, 2010    (JP) ................. 2010-211696

(51) Int. Cl.
*H04N 5/235* (2006.01)
*H04N 5/208* (2006.01)
*G03B 15/03* (2006.01)

(52) U.S. Cl.
USPC .................. 348/229.1; 348/221.1; 348/222.1; 348/362; 396/194

(58) Field of Classification Search
CPC ....... H04N 5/235; H04N 5/228; G03B 13/32; G03B 9/08; G03B 15/03; G03B 9/70; G03B 7/00; G03B 7/083; G03B 19/12
USPC .............. 348/221.1, 222.1, 362–367, 296, 348/E5.037, 248, 243, 241, 24, 229.1; 396/63, 65, 89, 169, 194, 297, 195, 396/235, 246, 247, 355
See application file for complete search history.

(56) References Cited

U.S. PATENT DOCUMENTS

| 6,542,194 | B1 | 4/2003 | Juen |
| 7,538,816 | B2 | 5/2009 | Harada |
| 7,889,273 | B2* | 2/2011 | Ward ........................... 348/362 |
| 8,018,497 | B2* | 9/2011 | Muraki et al. ............. 348/221.1 |
| 2004/0119835 | A1 | 6/2004 | Okamura |
| 2006/0055823 | A1* | 3/2006 | Kinoshita et al. ............. 348/511 |
| 2006/0087573 | A1 | 4/2006 | Harada |

(Continued)

FOREIGN PATENT DOCUMENTS

EP    1898635 A2    3/2008
JP    11-041523 A    2/1999

(Continued)

OTHER PUBLICATIONS

The extended European Search Report for European Application No. 11182393.6 mailed Apr. 16, 2013.

*Primary Examiner* — Lin Ye
*Assistant Examiner* — Marly Camargo
(74) *Attorney, Agent, or Firm* — Global IP Counselors, LLP

(57) ABSTRACT

An image capture device for capturing an image of an object includes a plurality of photoelectric conversion elements configured to output a signal corresponding to the image based on an amount of exposure between a first shutter operation for starting exposure and a second shutter operation for ending exposure, a controller configured to control the first shutter operation and the second shutter operation, and an image generation section configured to correct the signal, and to generate an output image corresponding to the signal after being corrected. The image generation section is configured to correct the signal based on variance in exposure duration among the plurality of photoelectric conversion elements between the first shutter operation and the second shutter operation.

20 Claims, 8 Drawing Sheets

(56) References Cited

U.S. PATENT DOCUMENTS

| | | |
|---|---|---|
| 2007/0116453 A1 | 5/2007 | Uchiyama |
| 2007/0189745 A1* | 8/2007 | Masuda ........................... 396/55 |
| 2008/0298791 A1* | 12/2008 | Noda ............................... 396/55 |
| 2009/0086056 A1* | 4/2009 | Asoma |
| 2009/0231450 A1* | 9/2009 | Tanaka et al. ............... 348/208.7 |
| 2010/0066897 A1* | 3/2010 | Miyanari ..................... 348/362 |

FOREIGN PATENT DOCUMENTS

| | | |
|---|---|---|
| JP | 2006-101492 A | 4/2006 |
| JP | 2007-215065 A | 8/2007 |
| JP | 2007-228047 A | 9/2007 |
| JP | 2008-147979 A | 6/2008 |
| JP | 2009-290732 A | 12/2009 |

* cited by examiner

IMAGE CORRECTION CIRCUIT, IMAGE CAPTURE DEVICE, IMAGE CORRECTION METHOD, AND IMAGE CORRECTION PROGRAM

CROSS-REFERENCE TO RELATED APPLICATIONS

This application claims priority to Japanese Patent Application No. 2010-211696 filed on Sep. 22, 2010. The entire disclosure of Japanese Patent Application No. 2010-211696 is hereby incorporated herein by reference.

BACKGROUND

1. Technological Field

The present invention relates to a technique for correcting images captured while exposure duration is controlled with a mechanical shutter.

2. Background Technology

Image capture devices in which the timing for starting exposure in a plurality of photoelectric conversion elements is controlled by an electronic shutter, while the timing for ending exposure is controlled by a mechanical shutter, have been proposed in the past (see Patent Citations 1 to 3). In these image capture devices, the intention was to bring about uniform exposure duration for the individual photoelectric conversion elements by controlling the timing at which the electronic shutter starts exposure in a manner compliant with the timing at which the mechanical shutter ends exposure. Typically, the plurality of photoelectric conversion elements are arrayed in straight lines, and the electronic shutter controls the timing for starting exposure in line units.

Japanese Laid-open Patent Publication Nos. 11-41523 (Patent Citation 1), 2006-101492 (Patent Citation 2), and 2008-147979 (Patent Citation 2) disclose such image capture devices for example.

SUMMARY

However, in the example of image capture devices like these, the timing at which the mechanical shutter ends exposure is dependent upon the movement of a light-blocking curtain, and as such has a non-linear characteristic. Therefore, it is difficult to control the electronic shutter starting exposure in a manner following the mechanical shutter ending the exposure. Specifically, the problem is that the electronic shutter must be operated at timing that has a non-linear characteristic, and a high processing load is imposed on the electronic shutter control circuitry when the electronic shutter is operated. If the mechanical shutter forms a border of a light-blocked region intersecting a line in which photoelectric conversion elements have been arrayed on the element surface, variance in exposure duration can arise among photoelectric conversion elements belonging to the line. A problem in this case is that despite the electronic shutter controlling the timing for starting exposure in line units, variance in the amount of exposure caused by variance in exposure duration arising among photoelectric conversion elements belonging to a line cannot be minimized. Even in image capture devices that do not use an electronic shutter, a similar problem of variance in exposure duration will arise, depending on the operating characteristics of the mechanical shutter.

With the foregoing in view, an object of the present invention is to minimize variance in the amount of exposure caused by operating characteristics of a mechanical shutter.

An image capture device for capturing an image of an object is provided. The image capture device includes a plurality of photoelectric conversion elements configured to output a signal corresponding to the image based on an amount of exposure between a first shutter operation for starting exposure and a second shutter operation for ending exposure, a controller configured to control the first shutter operation and the second shutter operation, and an image generation section configured to correct the signal, and to generate an output image corresponding to the signal after being corrected. The image generation section is configured to correct the signal based on variance in exposure duration among the plurality of photoelectric conversion elements between the first shutter operation and the second shutter operation.

Here, the image capture device may be a device having not only a function for capturing images, but other functions as well, such as a camera-equipped mobile phone or a camera-equipped personal computer. The discrepancy correction processing may be processing using information that directly indicates operating characteristics of the mechanical shutter, or processing using information that indicates operating characteristics of the mechanical shutter indirectly, such as the model of the image capture device, or the mechanical shutter mechanism. The discrepancy correction processing may be carried out by generating an image correction rule on the basis of the operating characteristics of the mechanical shutter during execution of the discrepancy correction processing; or a correction rule that was created beforehand on the basis of the operating characteristics of the mechanical shutter may be acquired. This correction rule may be constituted, for example, by a Look-Up Table (LUT) for a group of coefficients derived by specifying a correction coefficient for each pixel position in an image; or by a function that gives a correction amount with pixel position in an image as a variable. The discrepancy correction processing may be designed such that, in a case where, of the photoelectric conversion elements, a first photoelectric conversion element and a second photoelectric conversion element having a longer exposure duration than the first photoelectric conversion element have captured a subject emitting light of uniform brightness, the amount of correction of the output of the first photoelectric conversion element is greater than the amount of correction of the output of the second photoelectric conversion element. Also, the discrepancy correction processing may be designed such that the amount of correction of the outputs of all of the photoelectric conversion elements is zero or above. The correction amount is a value found by subtracting the value prior to correction from the value subsequent to correction.

Discrepancies in exposure duration among the plurality photoelectric conversion elements are prominent in images captured with the electronic front curtain-mechanical rear curtain shutter format.

The electronic front curtain-mechanical rear curtain shutter format is as follows. First, the timing for starting exposure of the plurality of photoelectric conversion elements is controlled by an electronic shutter. Specifically, exposure is started by starting accumulation of charges in the photoelectric conversion elements. Then, through motion of a light-blocking section by a mechanical shutter, a border of the light-blocked region moves across the element surface of the plurality of photoelectric conversion elements and blocks the light to the plurality of photoelectric conversion elements, thereby controlling the timing for ending exposure of the plurality of photoelectric conversion elements. In the present Specification, exposure refers to a state in which captured light reaches the photoelectric conversion elements, and the photoelectric conversion elements accumulate charges proportional to the quantity of captured light.

In this electronic front curtain-mechanical rear curtain shutter format, starting and ending of exposure in the photoelectric conversion elements are accomplished through mutually different mechanisms. Specifically, the operating characteristics of the electronic shutter and the operating characteristics of the mechanical shutter differ, and these differences may be a major cause of discrepancies in the amount of exposure. Because of this, discrepancies in the amount of exposure can be effectively minimized by carrying out correction based on differences between the operating characteristics of an electronic shutter and the operating characteristics of a mechanical shutter.

The characteristics of timing for starting and ending exposure in photoelectric conversion elements may be cited as an example of operating characteristics that can cause discrepancies in the amount of exposure. Because ending of exposure by a mechanical shutter is accomplished through mechanical movement of the light-blocking section, the characteristics of timing for ending exposure by the mechanical shutter are dependent upon the accelerated movement characteristics of the light-blocking section. In contrast to this, because the timing for starting exposure by an electronic shutter is not dependent upon the movement characteristics of the light-blocking section, the characteristics thereof differ from those of the timing for ending exposure of the photoelectric conversion elements by a mechanical shutter. The reason is that, in a case where the characteristics of the timing for starting exposure of the photoelectric conversion elements by an electronic shutter differ from the characteristics of the timing for ending exposure of the photoelectric conversion elements by a mechanical shutter, there are discrepancies among the photoelectric conversion elements in the exposure duration, which is equivalent to the interval between the start and the end of exposure. Because the amount of exposure increases with longer exposure duration, discrepancies in the amount of exposure arise in association with discrepancies in exposure duration. Accordingly, it is desirable to minimize discrepancies in the amount of exposure by carrying out correction so as to increase the amount of exposure for photoelectric conversion elements having shorter exposure durations, based on differences in the timing characteristics of an electronic shutter and the timing characteristics of a mechanical shutter.

An attempt may be made to bring about uniform exposure duration by controlling the timing at which the electronic shutter starts exposure in a manner compliant with the timing at which the mechanical shutter ends exposure, as taught in the prior art. However, in cases where a border of the light-blocked region formed on the element surface of the photoelectric conversion elements by the light-blocking section of the mechanical shutter intersects a line within which a plurality of photoelectric conversion elements that share wiring for the purpose of starting accumulation of charges are arrayed in a straight line, it is difficult to bring about uniform exposure duration using the methods of the prior art. The reason is that, in cases where a border of the light-blocked region intersects a line, discrepancies in exposure duration arise among photoelectric conversion elements belonging to a single line, and the effect of discrepancies in exposure duration among photoelectric conversion elements cannot be minimized even when exposure is started through control of the line as a whole. In such a case, there may be cases where photoelectric conversion elements within the line start exposure at the same time but end exposure at different timings; however, by carrying out mutually different discrepancy correction processing for at least two of the photoelectric conversion elements within such a line, it would be possible to bring about correction so as to minimize the effect of discrepancies in exposure duration among a plurality of photoelectric conversion elements belonging to a single line. A correcting section may correct an image in pixel units, or may correct an image in block units composed of a predetermined number of pixels.

To give examples of shutter mechanisms in mechanical shutters for which intersection of lines by the borders of the light-blocked region is a possibility: for example, in shutter mechanisms that involve rotational motion of the light-blocking section about a predetermined rotation axis, or shutter mechanisms in which an unblocked region constricts down to a single point on the element surface, and in other similar shutter mechanisms, the borders of the light-blocked region will intersect lines because the directions of the borders of the light-blocked region are not constant.

Having controlled the timing at which the electronic shutter starts exposure in a manner compliant with the timing at which the mechanical shutter ends exposure, as taught in the prior art, optionally, image correction may be carried out by the correcting section as well.

In the case of an electronic shutter, the state of exposure of the photoelectric conversion elements which have been arrayed on the element surface is controlled through direct electronic control of the photoelectric conversion elements. Specifically, an electronic shutter controls the state of exposure of the photoelectric conversion elements by substantially blocking captured light on the element surface. With a mechanical shutter, on the other hand, captured light is blocked by the light-blocking section, but typically the position of the light-blocking section is not situated on the element surface in the direction of the light axis along which captured light is blocked. The reason is that it is necessary to prevent frictional resistance from occurring between the light-blocking section and the element surface, and to prevent damage to the photoelectric conversion elements on the element surface. A mechanical shutter that blocks captured light at a position different from one on the element surface blocks the captured light in a state in which the light is not focused on the photoelectric conversion elements on the element surface. Specifically, when captured light focused on given photoelectric conversion elements is blocked, the mechanical shutter blocks a beam of the captured light in question having a certain width. Consequently, through operation of the mechanical shutter, the captured light that is focused on the given photoelectric conversion elements is progressively constricted, and upon finally reaching a stage in which the captured light that is focused on the photoelectric conversion elements in question becomes completely blocked, exposure of the photoelectric conversion elements in question ends. Here, the amount of exposure per unit of time is smaller during the constriction interval than during the interval during which the beam of captured light focused on the photoelectric conversion elements is not being constricted by the mechanical shutter. Consequently, discrepancies in the amount of exposure among photoelectric conversion elements will arise in association with discrepancies in the length of the intervals during which the mechanical shutter progressively constricts a beam of captured light focused on photoelectric conversion elements. The interval for which a beam of captured light is progressively constricted by the light-blocking section of a mechanical shutter is dependent upon the width of the beam at the position of the light-blocking section, while the width of the beam is dependent upon the distance between the light-blocking section and the element surface along the light axis direction.

Because of this, it is preferable for the correcting section to minimize discrepancies in the amount of exposure through correction proportional to the distance between the light-blocking section and the element surface.

Also, discrepancy in the amount of exposure as a proportion of the total amount of exposure decreases with longer exposure duration for carrying out capture. Because of this, it is preferable for the correcting section to minimize discrepancies in the amount of exposure through correction proportional to the set shutter speed. For example, discrepancy correction may be carried out using a LUT for a coefficient group of coefficients proportional to set shutter speed.

The operating characteristics of a mechanical shutter are dependent upon operating history and the operating environment during capture. For example, in cases where the light-blocking section is operated by spring force, the speed characteristics and acceleration characteristics of the light-blocking section will vary in a manner reflective of the interval for which an electromagnet retains the light-blocking section in opposition to spring force prior to operation of the light-blocking section, due to factors such as heating of the electromagnet or magnetization of the light-blocking section. Further, because the mechanical characteristics of springs vary with usage of the mechanical shutter and over time, the operating characteristics of mechanical shutters may be different in cases of differences in the number of times a mechanical shutter has been operated, or different manufacturing dates, or the like. Consequently, it is preferable for the correcting section to correct images in a manner reflective of operating history information of the mechanical shutter indicating the duration of the past operating interval, the number of times of operation, elapsed time since the manufacturing date, and the like. Further, the operating characteristics of mechanical shutters may vary in a manner reflective of mechanical shutter temperature, humidity, and the like during capture. Consequently, it is preferable for the correcting section to correct images in a manner reflective of operating environment information indicating mechanical shutter temperature, humidity, and the like.

Correction carried out by the image generation section may include at least one of optical black correction, color conversion processing, sharpness adjustment, noise removal, gamma correction, and resizing processing.

The image capture device of the present invention may also be realized through a device comprising a plurality of photoelectric conversion elements for output reflective of an exposed amount of exposure; a mechanical shutter for carrying out at least one of starting and ending exposure; and an image generation section for carrying out correction of the outputs of the plurality of photoelectric conversion elements having been exposed using at least the mechanical shutter, wherein the correction includes discrepancy correction processing based on discrepancies in exposure duration created among the plurality of photoelectric conversion elements by the use of at least the mechanical shutter, and then generating an image.

The image capture device of the present invention is not limited to realization as an independent device, and may be realized as an image correction circuit for carrying out the discrepancy correction processing of the present invention. The functions of the various means disclosed in the claims may be realized through hardware resources having functions identified by the configuration itself, through hardware resources having functions identified by a program, or a combination of these. The functions of these various means are not limited to being realized by hardware resources which are physically independent of one another. Further, the present invention may be embodied as an image correction method, or a recording medium of an image correction program. Of course, the recording medium for such a computer program may be a magnetic recording medium, a magnetooptical recording medium, or a recording medium to be developed in the future.

DETAILED DESCRIPTION OF EXEMPLARY EMBODIMENTS

Figure 1:
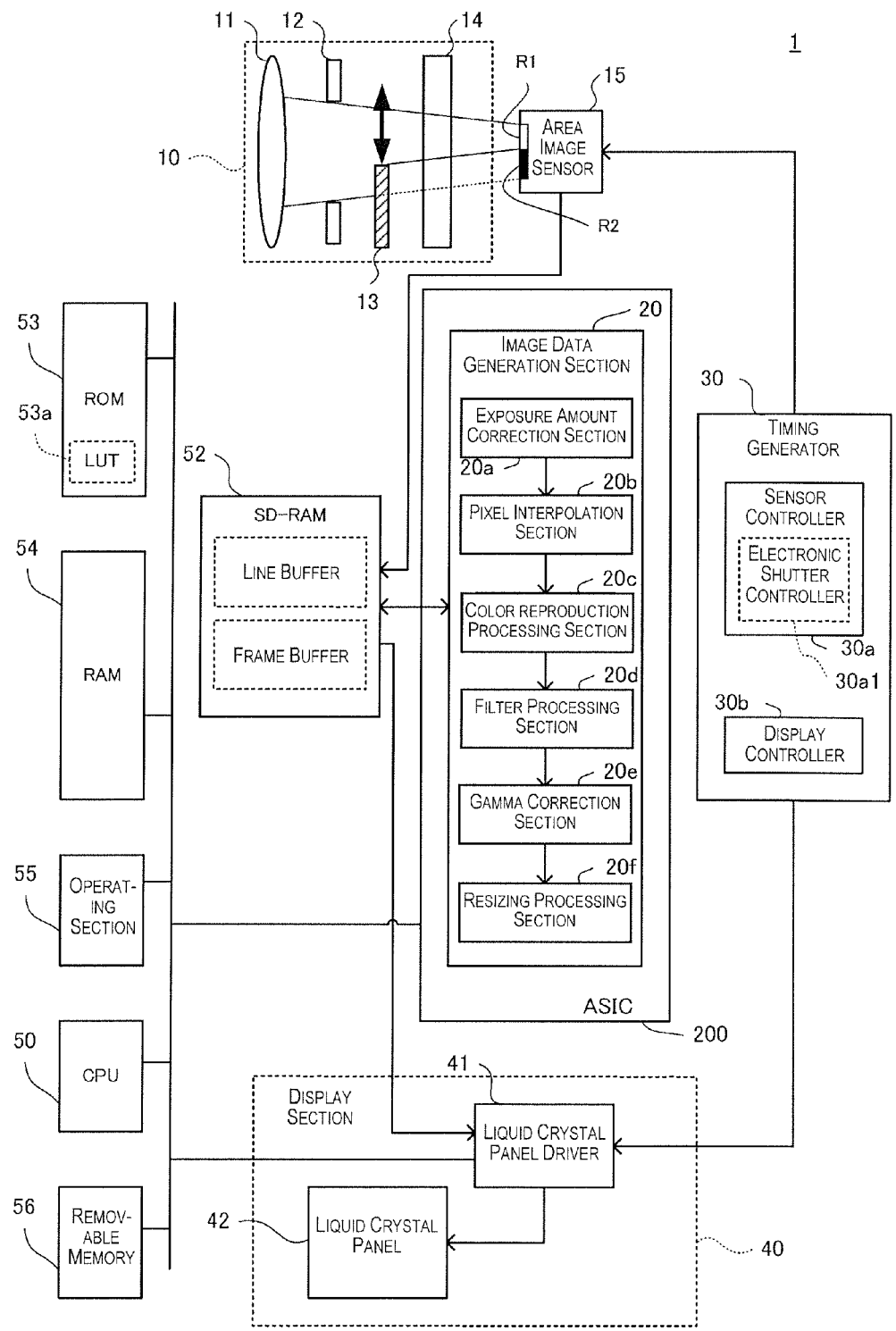
FIG. 1 is a block diagram depicting a digital camera.

Embodiments of the present invention will be described below in the following order with reference to the accompanying drawings. Corresponding elements in the drawings are assigned like symbols. Redundant description is omitted.

(1) Configuration of image capture device:
(2) Configuration of LUT:
(3) Modification Example 1:
(4) Modification Example 2:
(5) Modification Example 3:
(6) Modification Example 4:
(7) Modification Example 5:
(8) Modification Example 6:
(9) Modification Example 7:
(10) Modification Example 8:
(11) Modification Example 9:

(1) Configuration of Image Capture Device

FIG. 1 is an image capture device 1 which includes an image correction circuit according to an embodiment of the present invention. The image capture device 1 according to the present embodiment is a mirrorless digital camera having an electronic viewfinder (EVF). The image capture device 1 is provided with an optical system 10, an area image sensor 15, an ASIC 200, a timing generator 30, a display section 40, a CPU 50, an SD-RAM 52, a ROM 53, a RAM 54, an operating section 55, and a removable memory 56. Additionally, functional sections for carrying out other functions, such as a wireless communication section for wireless communication, can be provided as well. The CPU 50 appropriately utilizes the SD-RAM 52 and the RAM 54 to execute a program stored in the ROM 53. Through a function of the program in question, the CPU 50 executes a function for generating image data depicting a subject captured on the area image sensor 15 in a manner reflective of the operation of the operating section 55. The operating section 55 is provided with a shutter button and a dial switch for setting exposure duration (shutter speed).

The optical system 10 is provided with a lens 11, an aperture 12, a mechanical shutter 13, and a low pass filter 14. The lens 11 focuses captured light and forms an image of a subject on the area image sensor 15. The aperture 12 constricts the beam of captured light to adjust the quantity of captured light. In the case of aperture priority, the exposure duration (shutter speed) is set in a manner dependent not only on operation of the dial switch, but on the aperture 12 setting as well. The lens 11 and the aperture 12 are provided to an exchangeable lens unit, and the exchangeable lens unit in question can be exchangeably attached to the body of the image capture device 1. The low pass filter 14 blocks the spatial high frequency component of the captured light in the area image sensor 15, thereby preventing moiré in the captured image.

Figure 2A:
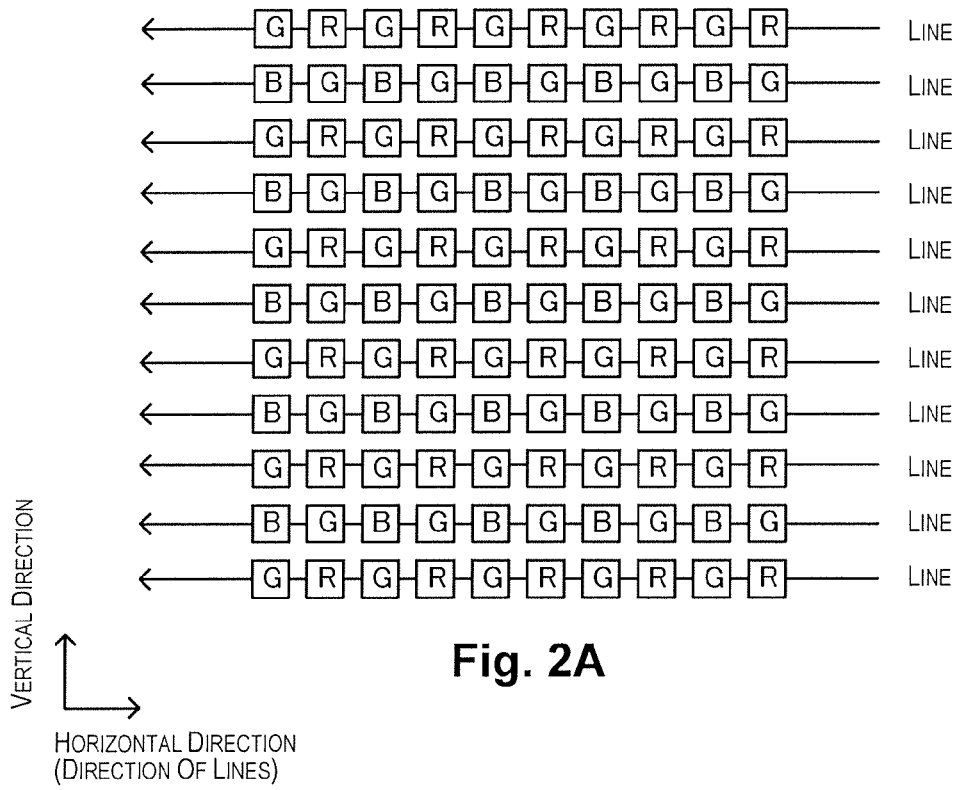
FIGS. 2A and 2B are model diagrams of an area image sensor.

FIG. 2A is a model diagram depicting part of the element surface of the area image sensor 15, which is viewed from the front. The area image sensor 15 is one provided, for example, with complementary metal oxide semiconductor (CMOS) image sensors having color filters and a plurality of photoelectric conversion elements for accumulating charge proportional to the amount of exposure arrayed on a predetermined element surface, charge coupled device (CCD) image sensors, or other solid imaging elements, arrayed in a Bayer array or honeycomb array. The present embodiment is described below, taking the example of a case where CMOS image sensors provided with color filters are used in a Bayer array. In FIG. 2A, the photoelectric conversion elements are depicted by squares, and the colors of the color filters (3 channels: red (R), green (G), blue (B)) provided in correspondence with the photoelectric conversion elements are depicted inside the squares. The array positions of the plurality of photoelectric conversion elements on the element surface of the area image sensor 15 are ordered by Cartesian coordinates, with a plurality of photoelectric conversion elements lined up in a direction parallel to one coordinate axis constituting lines, and with a plurality of lines arrayed lining up in a direction parallel to the other coordinate axis. In the specification, the direction parallel to the lines is termed the horizontal direction, and the direction perpendicular to the lines is termed the vertical direction.

In the area image sensor 15 of the present embodiment, charges that have accumulated in the photoelectric conversion elements can be reset (discharged) in line units. Specifically, charges in a plurality of photoelectric conversion elements belonging to the same line are reset simultaneously, and through a reset canceling operation, accumulation of charges simultaneously to one another starts. The start of the accumulation of charges in the photoelectric conversion elements means that exposure starts in the photoelectric conversion elements. For example, the photoelectric conversion elements are provided with resetting field effect transistors for discharging charge through conduction between a source and drain, and a wire for applying a voltage to the gates of the resetting field effect transistors is shared among photoelectric conversion elements belonging to the same line. The area image sensor 15 reads out, in line units, the charges which have accumulated in the photoelectric conversion elements. Depending on the required picture quality and speed, the area image sensor 15 can carry out intermittent readout without reading from all of the lines. In the photoelectric conversion elements, charges are also reset in cases where readout of charges has been carried out. Using an A/D converter or the like, the area image sensor 15 performs A/D conversion of tone values of amounts of exposure corresponding to the read-out charges, and generates image-capturing data associated with pixels. This image-capturing data corresponds to one mode of image of the present invention. The pixels of the image-capturing data correspond uniquely to the photoelectric conversion elements. The image-capturing data read from the area image sensor 15 is buffered to the SD-RAM 52, and various types of image processing are executed on the image-capturing data by the ASIC 200, discussed later.

Figure 2B:
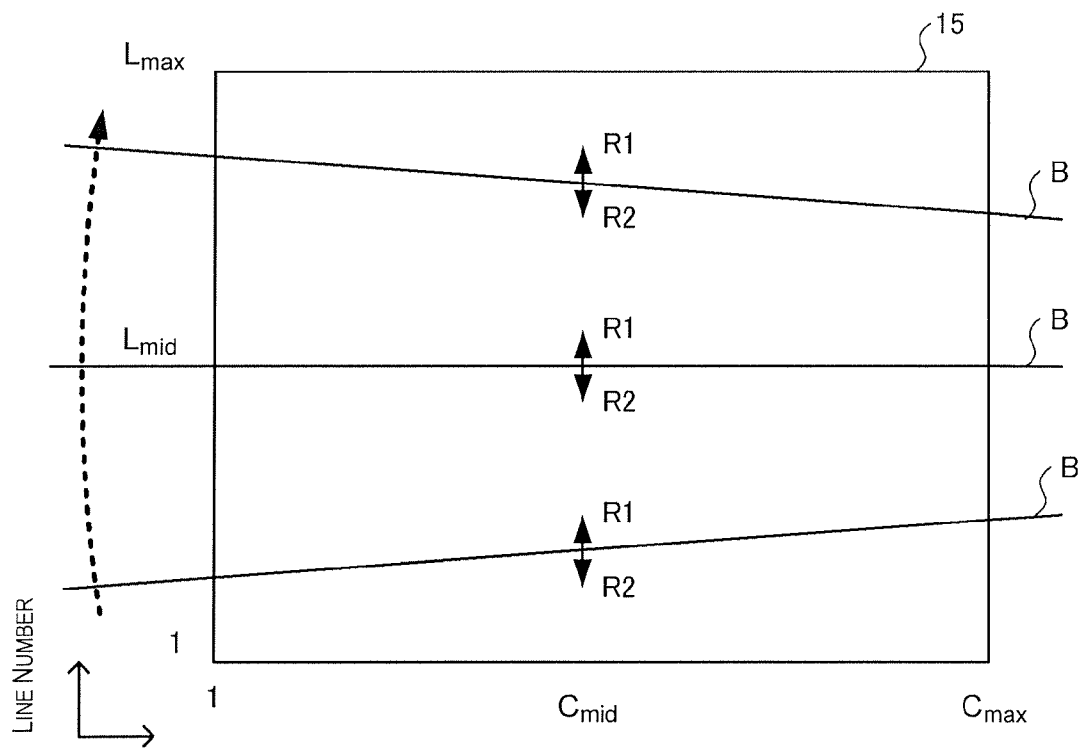

FIG. 2B is a model diagram depicting the entire element surface of the area image sensor 15, which is viewed from the front. Line numbers L (from 1 to Lmax) increasing in increments of one going upward in the vertical direction are appended to the lines, and column numbers C (from 1 to Cmax) increasing in increments of one going rightward in the horizontal direction are appended to vertical columns orthogonal to the lines. The line number L of the line at the middle in the vertical direction is represented by Lmid, and the column number C of the middle column in the horizontal direction by Cmid. The mechanical shutter 13 of the present embodiment is provided with a light-blocking curtain (illustrated by hatching in FIG. 1) as a light-blocking section of flat plate form substantially parallel to the element surface of the area image sensor 15 on which the plurality of photoelectric conversion elements are arrayed. Through this light-blocking curtain, an exposed region R1 and a light-blocked region R2 are formed on the element surface of the area image sensor 15 in which the plurality of photoelectric conversion elements are arrayed. Specifically, the light-blocked region R2 is produced by the shadow of the light-blocking curtain on the element surface of the area image sensor 15. The mechanical shutter 13 operates the light-blocking curtain in the following manner.

The mechanical shutter 13 of the present embodiment is of normally-open type, and in a state with the image capture device 1 in image capture mode, the light-blocking curtain is latched by a latching lever, as well as being retained through attraction by a permanent magnet. The light-blocking curtain is latched outside of the optical path of the captured light through latching by the latching lever and attraction by the permanent magnet, in opposition to the spring force of a spring which pulls the light-blocking curtain to a position entirely blocking the captured light. Then, in a state with the image capture device 1 powered on and set to image capture mode, latching of the light-blocking curtain by the latching lever is canceled. Despite the fact that latching of the light-blocking curtain by the latching lever is canceled, the light-blocking curtain is retained through attraction by the permanent magnet, and the light-blocking curtain continues to be retained in opposition to the spring force, whereby light passing through the lens continues to strike the area image sensor 15. Then, when the shutter button is pressed, the charges that have accumulated in the photoelectric conversion elements are reset by an electronic shutter controller 30a1, and exposure to carry out accumulation of charges starts. Thereafter, once a further interval corresponding to the exposure duration (shutter speed) has elapsed since the start of exposure, an electrical current is supplied to an electromagnet adapted to produce magnetic energy for overcoming the magnetic energy of the permanent magnet attracting the light-blocking curtain, and retention of the light-blocking curtain through attraction by the permanent magnet is canceled. Because of this, the light-blocking curtain, moved by spring force, moves to a position at which the light-blocking curtain entirely blocks the captured light. Thereafter, readout of the charges is carried out, and image-capturing data is generated. The light-blocking curtain is then rolled up, the light-blocking curtain is again retained through attraction by the permanent magnet, and light passing through the lens now strikes the area image sensor 15.

FIG. 2B depicts in model form the movement of a border B of the exposed region R1 and the light-blocked region R2 across the element surface of the area image sensor 15, due to movement of the light-blocking curtain by spring force of the mechanical shutter 13. In the present embodiment, when the shutter closes due to upward pulling of the light-blocking curtain by the spring, the border B of the exposed region R1 and the light-blocked region R2 moves from downward to upward (in the direction of the broken-line arrow). Because of movement of the light-blocking curtain, the border B reaches the photoelectric conversion elements, where exposure of the photoelectric conversion elements ends. In the mechanical shutter 13 of the present embodiment, the light-blocking curtain is supported in rotatable moving fashion about a rotating shaft (not shown in Figures) which is furnished to the right side of the element surface of the area image sensor 15. In the present embodiment, when the border B reaches the line at the middle in the vertical direction, the border B is oriented parallel to the line. Before the border B reaches the line at the middle in the vertical direction, the border B is inclined upward to the right, becoming progressively closer to parallel to the line. Once the border B reaches the line at the middle in the vertical direction, the border B assumes a progressively greater angle of incline downward to the right. Specifically, the direction of the border B on the element surface of the area image sensor 15 is not constant, and the border B basically intersects the lines. If the rotating shaft of the light-blocking curtain is furnished at a position sufficiently far from the element surface of the area image sensor 15, it will appear that the border B is parallel to the lines. In the present embodiment, however, due to requirements relating to compact size of the image capture device 1, fast operation of the mechanical shutter 13, and the like, the rotating shaft of the light-blocking curtain is furnished at a position such that the border B can intersect the lines.

The timing generator 30 is provided with a sensor controller 30a and a display controller 30b, while the sensor controller 30a is provided with an electronic shutter controller 30a1. The sensor controller 30a generates a signal for controlling the timing of the various operations of the photoelectric conversion elements in a liquid crystal panel 42, and outputs the signal to the area image sensor 15. The display controller 30b generates a signal for controlling the display timing of the display pixels of the liquid crystal panel 42, and outputs the signal to a liquid crystal panel driver 41.

When the shutter button in the operating section 55 is pressed, the electronic shutter controller 30a1 releases the electronic shutter. Release of the electronic shutter means that the charges in all of the photoelectric conversion elements of the area image sensor 15 are reset, accumulation of charges is resumed, and exposure for the purpose of reading out the charges is started. Exposure refers to a state in which light is actually striking the area image sensor 15, and refers also to a state in which the electronic shutter is released and accumulation of charges is being carried out for the purpose of reading out the charges. As discussed previously, in the present embodiment, it is possible for accumulated charges in the plurality of photoelectric conversion elements to be reset in line units, and for accumulation by all of the photoelectric conversion elements to be started by carrying out charge reset and starting charge accumulation in that order for all of the lines. Alternatively, the electronic shutter controller 30a1 can carry out charge reset simultaneously for all of the lines, and thereafter start charge accumulation in line units in a sequential manner. In either case, the timing at which exposure of the photoelectric conversion elements starts will be different for each line.

The display section 40 is an EVF, and carries out various displays. For example, it can display a so-called preview video generated through readout by intermittent line readout of exposure amount data detected by the photoelectric conversion elements of the area image sensor 15; display a menu screen; or display a still image of the captured subject. The display section 40 is provided with an interface circuit (not shown in Figures) the liquid crystal panel driver 41, the liquid crystal panel 42, an eyepiece lens (not shown in Figures) and the like. The liquid crystal panel driver 41 applies voltage to the subpixels and outputs a signal for driving the liquid crystals to the liquid crystal panel 42.

The ASIC 200 is provided with an image data generation section 20. This image data generation section 20 utilizes a line buffer or frame buffer pre-allocated in the SD-RAM 52, and executes various kinds of image processing through pipeline processing of the image-capturing data that was captured by the area image sensor 15. The ASIC 200 can also be an image processing digital signal processor (DSP). The image data generation section 20 is provided with an exposure amount correction section 20a, a pixel interpolation section 20b, a color reproduction processing section 20c, a filter processing section 20d, a gamma correction section 20e, and a resizing processing section 20f.

The image data generation section 20 is an example of an image acquisition section for acquiring image-capturing data captured by the area image sensor 15. The exposure amount correction section 20a in an example of a correction section for carrying out discrepancy correction processing to correct image-capturing data in such a way as to minimize variance in the exposure amounts in the plurality of photoelectric conversion elements. The exposure amount correction section 20a of the present embodiment makes reference to a LUT 53a recorded in the ROM 53, to correct for each pixel the tone value of the amount of exposure in the image-capturing data. The LUT 53a is composed of data that records parameters of discrepancy correction processing to be carried out for one or each of a plurality of photoelectric conversion elements provided to the area image sensor 15. Specifically, it is a table of data for a coefficient group of coefficients specified for all of the photoelectric conversion elements of the area image sensor 15 and intended to be multiplied by the exposure amounts of the photoelectric conversion elements provided to the area image sensor 15, the table having been created in advance for each of the settable exposure durations (shutter speeds). The exposure amount correction section 20a acquires the exposure duration (shutter speed) which has been set during capture, and makes reference to the LUT 53a that corresponds to the exposure duration (shutter speed). Because the pixels of the image-capturing data correspond uniquely to the plurality of photoelectric conversion elements of the area image sensor 15, the exposure amount correction section 20a can correct and identify gain of the exposure amount to be multiplied for each pixel.

The pixel interpolation section 20b carries out interpolation processing using tone values of neighboring pixels in order to calculate tone values of colors of two channels different from the color of the color filter that is provided to the photoelectric conversion element corresponding to each pixel. As a result, there is generated image-capturing data in which tone values of three channels are associated with each pixel. The color reproduction processing section 20c carries out 3×3 matrix operations on tone values of the pixels of the image-capturing data for which pixel interpolation has been completed, in order to carry out color conversion processing for the purpose of color matching. The filter processing section 20d executes sharpness adjustment, noise removal processing, and so on, on the image-capturing data by filter processing. The gamma correction section 20e executes gamma correction to compensate for characteristic differences between color indicated by tone values of image-capturing data from the area image sensor 15 and color indicated by tone values of image data handled by the display section 40, and the like. The resizing processing section 20f makes successive reference to data recorded in the line buffer in question to carry out interpolation calculation processing, and identifies tone values of each channel at positions between pixels in order to carry out resizing to the recorded size, for example. Once resizing by the resizing processing section 20f is completed, the image data generation section 20 can generate image data in which each image processing has been completed. This image data is buffered to the SD-RAM 52, and displayed on the display section 40 as well as being recorded to the removable memory 56. The exposure amount correction section 20a can be provided before or after any of the circuits 20b to 20f of the image data generation section 20. While it is preferable for correction of the amount of exposure by the exposure amount correction section 20a to be carried out before pixel interpolation by the pixel interpolation section 20b, it can be carried out after pixel interpolation by the pixel interpolation section 20b.

(2) Configuration of LUT

Figure 3A:
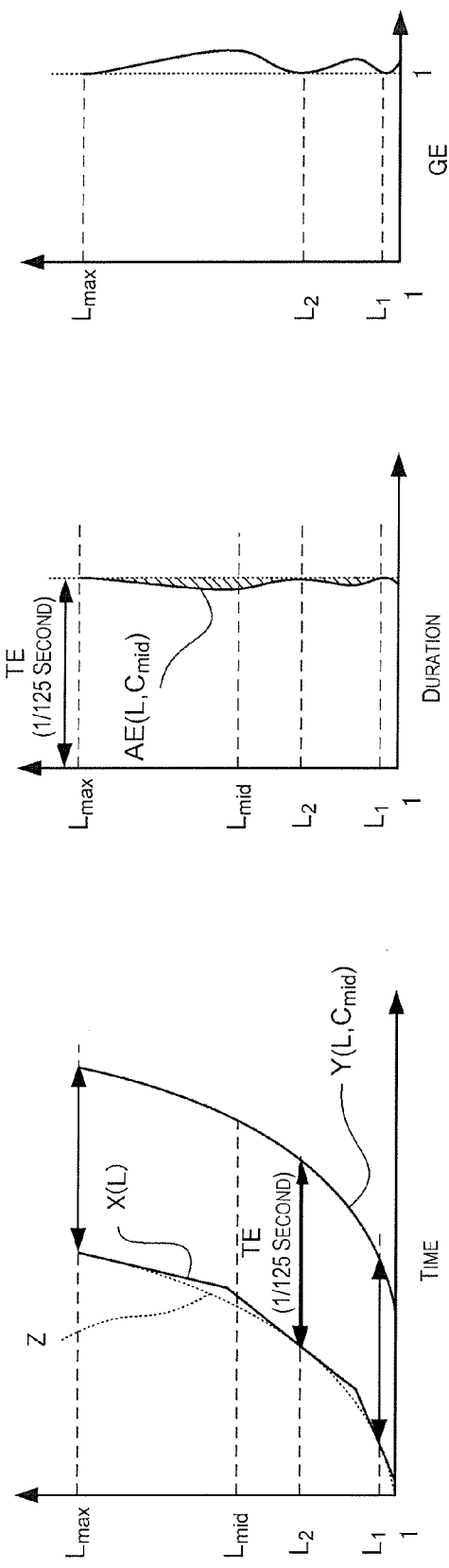
FIGS. 3A and 3B are graphs depicting timing of exposure.
Figure 3B:
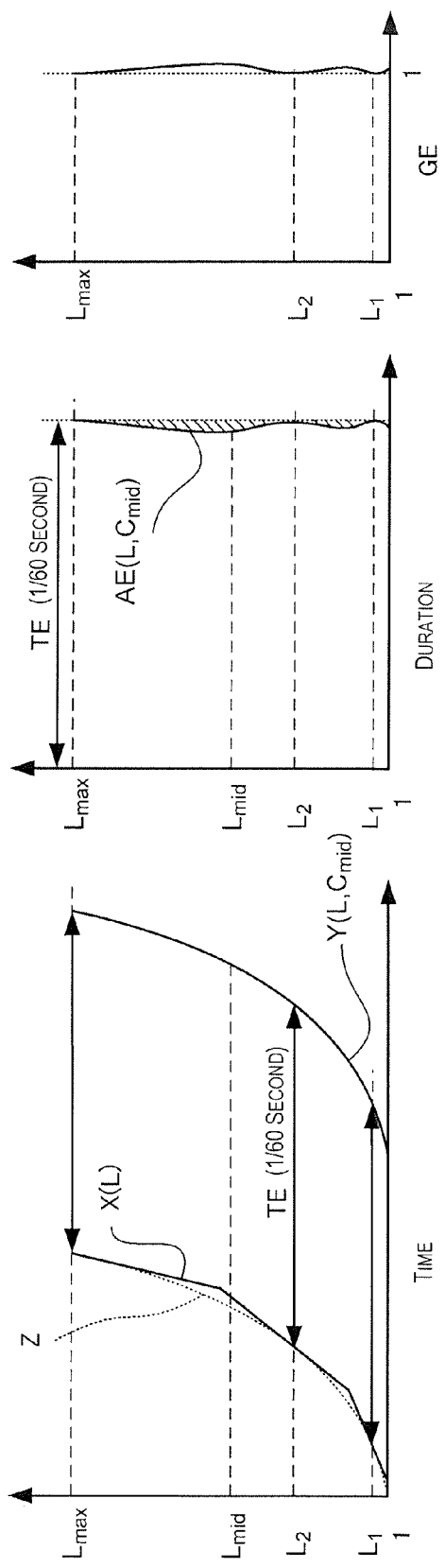

The left graphs of FIGS. 3A and 3B are graphs depicting the timing of exposure in the column at the middle in the horizontal direction (column number Cmid) of the area image sensor 15. The left graph of FIG. 3A depicts a case where the set exposure duration (shutter speed) TE is 1/125 second, while the left graph of FIG. 3B depicts one where the set exposure duration (shutter speed) TE is 1/60 second. In the left graphs in FIGS. 3A and 3B, the horizontal axis depicts time, and the vertical axis depicts the line number L. The polygonal curves at the left side in the left graphs of FIGS. 3A and 3B depict the timing of the start of exposure of photoelectric conversion elements of each line of the area image sensor 15, with the timing (time) in question being given by a function $X(L)$ of the line number L. The curves at the right side in the left graphs of FIGS. 3A and 3B depict the timing of the end of exposure, with the timing (time) in question being given by a function $Y(L, C)$ of the line number L and the column number C of the photoelectric conversion elements. Hereinbelow, in cases where there is no need to point out specific line numbers L and column numbers C, notations of the variables $(L, C)$, $(L)$, and the like in the functions can be omitted in some cases. Also, because exposure starts through simultaneously starting to accumulate charge in all of the photoelectric conversion elements belonging to a line, the timing $X(L)$ is not a function of the column number C. The timing $Y(L, C)$ for the end of exposure, on the other hand, is a function of the column number C because the motion of the light-blocking curtain of the mechanical shutter 13 has a region that is not parallel to the lines. Here, the polygonal curves at the left side in the left graphs of FIGS. 3A and 3B depict the operating characteristics of the electronic shutter, whereas the timing at the right side depicts the operating characteristics of the mechanical shutter. While the characteristics of the electronic shutter are here represented by a three-segment polygonal curve, representation by a three-segment polygonal curve is not necessary, and representation by a straight line, or a polygonal curve of several tens of segments or more, rather than a three-segment polygonal curve, is also acceptable.

As discussed above, exposure in the photoelectric conversion elements is started through resetting of charge by the electronic shutter controller 30a1, followed by starting to accumulate charge, and therefore the timing X of the start of exposure corresponds to the operating characteristics of the electronic shutter. On the other hand, exposure in the photoelectric conversion elements ends when the border B between the exposed region R1 and the light-blocked region R2 reaches the photoelectric conversion elements through the motion of the light-blocking curtain of the mechanical shutter 13, and therefore the timing Y of the end of exposure corresponds to the operating characteristics of the mechanical shutter 13. The actual exposure duration $AE(L, C)$ in the photoelectric conversion elements is the interval from the start of exposure by the electronic shutter to the end of exposure by the mechanical shutter 13, and the differential $\{Y(L, C)-X(L)\}$ of the timing X and the timing Y in the horizontal axis direction means the actual exposure duration $AE(L, C)$ of the photoelectric conversion elements.

Here, in order to simplify description of operation as affected by spring force, frictional force, and the like, the light-blocking curtain of the mechanical shutter 13 is assumed to carry out uniformly-accelerated movement from a line below toward a line above in the middle column in the horizontal direction (column number Cmid). In this case, the position in the vertical direction of the border B between the exposed region R1 and the light-blocked region R2 transitions to a parabola of progressively increasing slope. Consequently, as depicted by the timing Y, the line number at the end of exposure of the photoelectric conversion elements increases in parabolic fashion with the passage of time. Specifically, the timing Y is an inverse function of a quadratic function.

In the present embodiment, with the aim of uniform actual exposure durations in the photoelectric conversion elements belonging to each line, the timing X of the electronic shutter is rendered as a polygonal curve compliant with the timing Y of the mechanical shutter 13. Specifically, the timing X of the electronic shutter is created as follows. First, the timing $Y(L, Cmid)$ at which the border B reaches the photoelectric conversion elements belonging to the middle column in the horizontal direction (column number Cmid) is identified on the basis of an equation of movement of the light-blocking curtain. Then, an offset curve Z (see the broken lines in the drawing), in which the timing $Y(L, Cmid)$ is offset to an earlier time by the equivalent of the set exposure duration (shutter speed) TE, is created. Next, tangent lines respectively tangent to this offset curve Z at line numbers L1, L2, and Lmax are created. Let $1<L1<L2<Lmax$. Then, a three-segment polygonal curve having as inflection points the intersection point of the two tangent lines respectively tangent to the offset curve Z at line numbers L1 and L2 and the intersection point of the two tangent lines respectively tangent to the offset curve at line numbers L2 and Lmax is created, and the three-segment polygonal curve in question is adopted for the timing X of the electronic shutter. Because the timing X of the electronic shutter is compliant with a parabola of progressively greater slope, counting from the bottom, the slope of the first segment is smaller than the slope of the second segment, and the slope of the second segment is smaller than the slope of the third segment. The number of segments of the polygonal curve is not limited to three, and zero segments (i.e., a straight line, not a polygonal curve) or a one-segment polygonal curve, as well as a polygonal curve of four or more segments, is also acceptable. While a greater number of segments affords more accuracy, the processing load is greater, and therefore the number of segments must be set in consideration of a balance between these.

The electronic shutter controller 30a1 carries out a rolling shutter operation to start exposure of the photoelectric conversion elements in ascending order of line number, as well as adopting a duration proportional to the slope of the timing X of the three-segment polygonal curve, for the timing gap between the start of exposure of adjacent lines. Specifically, the timing gap between the start of exposure of adjacent lines of line numbers corresponding to a polygonal curve of n (n is a natural number ≤3) segments is one that is both constant and ensured to be longer than the timing gap of the start of exposure between lines of adjacent line numbers corresponding to a polygonal curve of (n+1) segments. When the shutter button is pressed, the electronic shutter controller 30a1 first starts accumulation of charges by the photoelectric conversion elements beginning with the lowermost line, and after waiting a predetermined interval from the start timing in question, the mechanical shutter 13 supplies an electrical current to the electromagnet and causes attraction of the light-blocking curtain by the permanent magnet to be canceled, and the light-blocking curtain to be moved by spring force. The aforedescribed predetermined interval is substantially equal to the set exposure duration (shutter speed) TE, and represents an interval such that the actual exposure duration AE(L, Cmid) of photoelectric conversion elements that, of the photoelectric conversion elements of the lines of line numbers L1, L2, and Lmax, are those belonging to the middle column in the horizontal direction (column number Cmid), equals the set exposure duration (shutter speed) TE.

The electronic shutter controller 30a1 controls the timing of the start of exposure of the photoelectric conversion elements belonging to each line in the above manner, to bring the timing into compliance with the timing Y(L, Cmid) of the mechanical shutter 13, whereby the actual exposure duration AE(L, Cmid) of the photoelectric conversion elements that belong to the middle column in the horizontal direction can be brought into approximation with the set exposure duration (shutter speed) TE.

However, it is difficult to bring the timing X of the electronic shutter (a polygonal curve) into complete compliance with the timing Y(L, Cmid) of the mechanical shutter 13 (a parabola); and as depicted by the middle graphs in FIGS. 3A and 3B, the actual exposure duration AE(L, Cmid)={Y(L, Cmid)−X(L)} of the photoelectric conversion elements belonging to the middle column in the horizontal direction is not constant, thus giving rise to error (illustrated by hatching) of the actual exposure duration AE(L, Cmid) corresponding to the exposure duration (shutter speed) TE. The magnitude of this error is dependent upon the positions of the photoelectric conversion elements in the vertical direction. Next, actual exposure durations AE(L, C) in photoelectric conversion elements belonging to columns other than the middle column in the horizontal direction are considered.

Figure 4:
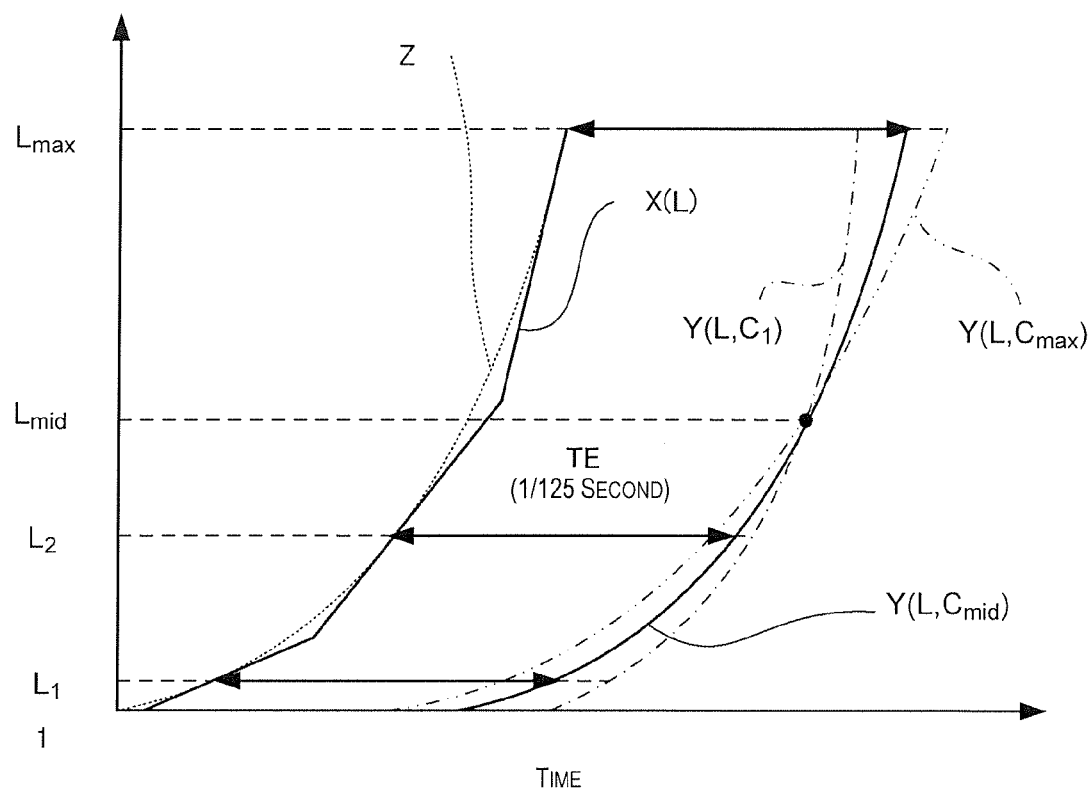
FIG. 4 is a graph depicting timing of exposure.

FIG. 4 is a graph depicting the timing of exposure in photoelectric conversion elements belonging to columns of the area image sensor 15. In the drawing, the timing Y(L, Cmid) of the ending of exposure for the photoelectric conversion elements belonging to the middle column in the horizontal direction is indicated by the solid line, and the timing Y(L, C1), Y(L, Cmax) of the ending of exposure for the photoelectric conversion elements belonging to the columns to the left end and right end thereof are respectively depicted by a single-dot and dash line and a double-dot and dash line. As depicted in FIG. 2B, because the border B of the exposed region R1 and the light-blocked region R2 changes direction as it moves, the timing Y(L, C) differs for each column number C. Specifically, up to the point that the border B reaches the line at the middle in the vertical direction (line number Lmid), the border B is oriented upward toward the right, and therefore exposure ends sooner for those photoelectric conversion elements closer to the right end. Consequently, until the border B reaches the line at the middle in the vertical direction, the timing Y(L, Cmax) precedes the timing Y(L, Cmid), and the timing Y(L, Cmid) precedes the timing Y(L, C1). On the other hand, after the border B has reached the line at the middle in the vertical direction, the border B becomes oriented downward toward the right, and therefore exposure ends sooner for those photoelectric conversion elements closer to the left end. Consequently, after the border B has reached the line at the middle in the vertical direction, the timing Y(L, C1) precedes the timing Y(L, Cmid), and the timing Y(L, Cmid) precedes the timing Y(L, Cmax). All of the photoelectric conversion elements belonging to the line at the middle in the vertical direction (line number Lmid) experience simultaneous ending of exposure, and the timing Y(Lmid, C1), Y(Lmid, Cmid), and Y(Lmid, Cmax) for the line number Lmid coincide.

In this way, the graphs of the timing Y(L, C1), Y(L, Cmid), Y(L, Cmax) at which exposure ends differ from one another depending on the positions of the photoelectric conversion elements in the horizontal direction. In contrast to this, for the photoelectric conversion elements of the column at the middle in the optically horizontal direction, exposure of all of the photoelectric conversion elements belonging to the column starts at timing X(L) in compliance with the timing Y(L, Cmid), and therefore the graphs of actual exposure durations AE(L, C1), AE(L, Cmax) for photoelectric conversion elements belonging to columns other than the column at the middle in the horizontal direction have greater variance than the graph of actual exposure duration AE(L, Cmid) for the photoelectric conversion elements belonging to the column at the middle in the horizontal direction. Also, due to limitations imposed by wiring for resetting charges and limitations imposed by the processing load that can be applied, it would be difficult to control the timing X for starting exposure individually for each column of photoelectric conversion elements. Specifically, insofar as the border B intersects the lines, variance in actual exposure duration will arise in a manner dependent upon the position of the photoelectric conversion elements in the horizontal direction, even if the timing X for starting exposure is adjusted.

In the present embodiment, the computer for creating the LUT 53a estimates the movement of the light-blocking curtain, and further estimates the shift of the border B between the exposed region R1 and the light-blocked region R2 by the light beam estimate of captured light, whereby the actual exposure duration AE(L, C) is calculated for all of the photoelectric conversion elements. Then, as depicted by the right graphs in FIGS. 3A and 3B, gain GE(L, C) is calculated by dividing the set exposure duration (shutter speed) TE by the actual exposure duration AE(L, C). In FIGS. 3A, 3B, and 4, the timing Y is illustrated for photoelectric conversion elements belonging to columns at the left end, middle, and right end in the horizontal direction, but the timing Y for the photoelectric conversion elements belonging to all of the columns is estimated and gain GE is calculated. Gain GE is stored in the LUT 53a in association with the photoelectric conversion elements.

Here, for photoelectric conversion elements whose actual exposure duration AE(L, C) is shorter than the set exposure duration (shutter speed) TE, the gain GE(L, C) is greater than 1, and conversely, for photoelectric conversion elements whose the actual exposure duration AE(L, C) is longer than the set exposure duration (shutter speed) TE, the gain GE(L, C) is less than 1. However, it is preferable to design the operating characteristics of the electronic shutter such that the actual exposure duration AE(L, C) is equal to or less than the exposure duration (shutter speed) TE, in order that the value of gain GE is always one or greater. By bringing the value of gain GE to one or greater, a correction amount which is the value derived by subtracting the amount of exposure before correction from the amount of exposure after correction will be zero or greater. The quantity of light variations and color variations occurring in the resulting images can thereby be minimized by adopting an approach in which the amount of exposure after correction in cases where the amount of exposure prior to correction is saturated is less than the numerical value representing the saturated state. Also, a larger proportion of error between actual exposure duration AE(L, C) and the set exposure duration (shutter speed) TE, in relation to the exposure duration (shutter speed) TE, results in values for gain GE(L, C) that increasingly differ from one. As will be appreciated from comparison of the graphs in FIGS. 3A and 3B, where the operating characteristics of the electronic shutter are constant, the magnitude of error between actual exposure duration AE(L, C) and the set exposure duration (shutter speed) TE is constant and not dependent on the set exposure duration (shutter speed) TE. The reason is that the light-blocking curtain operates in similar fashion through spring force even if the set exposure duration (shutter speed) TE changes. Because of this, the longer the set exposure duration (shutter speed) TE is, the smaller the degree to which error between actual exposure duration AE(L, C) and the set exposure duration (shutter speed) TE contributes to gain GE(L, C) will be, and the closer the value of gain GE(L, C) comes to one. Because gain GE is dependent on the set exposure duration (shutter speed) TE in this way, the exposure amount correction section 20a uses gain GE proportional to the set exposure duration (shutter speed) TE when carrying out discrepancy correction. For example, the computer creates a LUT 53a for all of the possible settings of the exposure duration (shutter speed) TE and records these in the ROM 53, whereupon the exposure amount correction section 20a acquires for use a LUT 53a that is proportional to the set exposure duration (shutter speed) TE; or a LUT proportional to a representative exposure duration (shutter speed) TE is created and recorded in the ROM 53, and in the case of another exposure duration (shutter speed) TE, the exposure amount correction section 20a carries out translation based on this LUT, and calculates for use gain GE(L, C) that is proportional to the exposure duration (shutter speed) at the time of capture; or absolute value information for error of every photoelectric conversion element is recorded in the ROM 53, and the exposure amount correction section 20a calculates for use gain GE(L, C) that is proportional to the exposure duration (shutter speed) at the time of capture on the basis of this absolute value of error information. It is not essential that gain GE for all of the photoelectric conversion elements be recorded in the ROM 53, and it is acceptable, for example, to calculate gain GE for a portion of the photoelectric conversion elements, and to calculate gain GE for other photoelectric conversion elements through interpolation operations based on positional relationships of photoelectric conversion elements on the element surface. Also, whereas basically the border B of the light-blocked region formed by the mechanical shutter 13 is assumed to intersect the lines, the situation is similar in a case where parallel to the lines. In this case, because actual exposure duration AE(L, C) is not dependent on the column number C, gain GE(L, C) is not dependent on the column number C either. Therefore, in the LUT 53a, gain GE(L) can be stored for each of the individual lines.

In discrepancy correction processing, the exposure amount correction section 20a, making reference to the LUT 53a that corresponds to the exposure duration (shutter speed) at the time of capture, multiplies gain GE of the photoelectric conversion elements corresponding to the pixels by the tone values of the amount of exposure of the pixels in the image-capturing data. Through multiplication of gain GE by the tone values of the amount of exposure in this manner, the amount of exposure can be increased for photoelectric conversion elements with short actual exposure duration AE(L, C), while the amount of exposure can be reduced for photoelectric conversion elements with long actual exposure duration AE(L, C), and the effect of exposure duration variance on the amount of exposure can be minimized. Gain GE can be specified in pixel units, specifically, in photoelectric conversion element units, in the LUT 53a, and therefore the effect of exposure duration variance dependent upon positions of photoelectric conversion elements in both the vertical direction and the horizontal direction can be minimized. In particular, while exposure duration variance in the horizontal direction arising due to intersection of the lines by the border B of the exposed region R1 and the light-blocked region R2 cannot be eliminated even if the timing X of the electronic shutter is brought into complete compliance with the timing Y(L, Cmid) of the mechanical shutter 13, the effect of exposure duration variance in the horizontal direction can be minimized by carrying out correction with the LUT 53a. In the present embodiment, correction is carried out through multiplication of gain GE on the assumption of a proportional relationship between exposure duration and amount of exposure, but in a case where nonlinearity of exposure duration and amount of exposure is contemplated, an operation parameter can be stored in the LUT 53a, and amount of exposure correction can be carried out through a nonlinear operation using this operation parameter.

(3) Modification Example 1

Whereas a case where an electronic shutter and a mechanical shutter 13 are used was described above, the present invention can also be implemented in a case where an electronic shutter is not used for starting exposure. For example, implementation is possible in a case where, in a state with the area image sensor 15 blocked by the light-blocking curtain of the mechanical shutter 13, the charges in all of the photoelectric conversion elements of the area image sensor 15 are reset, and thereafter exposure of the area image sensor 15 starts by operation of the mechanical shutter 13, then exposure of the area image sensor 15 ends through operation of the mechanical shutter 13 in a manner reflective of the elapse of the set exposure duration (shutter speed) TE. In this case, discrepancy correction processing would be carried out in a manner reflective of differences between operating characteristics of the mechanical shutter 13 during the start of exposure, and operating characteristics of the mechanical shutter 13 during the end of exposure. This is particularly effective in a case where, as with a mechanical shutter 13 of aperture shutter design, the light-blocking curtain is composed of one or a plurality of (e.g. 5) aperture blades, with exposure being started by driving the aperture blade(s) to open up an optical path from the center optical axis, and exposure being ended by driving the aperture blade(s) to constrict the optical path toward the center optical axis.

(4) Modification Example 2

Whereas an example of creation of a LUT 53a for minimizing the effect of exposure duration variance arising exclusively due to differences in the characteristics of timing of operation of the electronic shutter and of the light-blocking curtain of the mechanical shutter 13 was described above, a LUT 53a for minimizing variance in the amount of exposure could be created in contemplation of other operating characteristics of the mechanical shutter 13. For example, a LUT 53a could be created in contemplation of the characteristics of constriction of a beam of captured light by the electronic shutter, and the characteristics of constriction of a beam of captured light by the mechanical shutter 13.

Figure 5A:
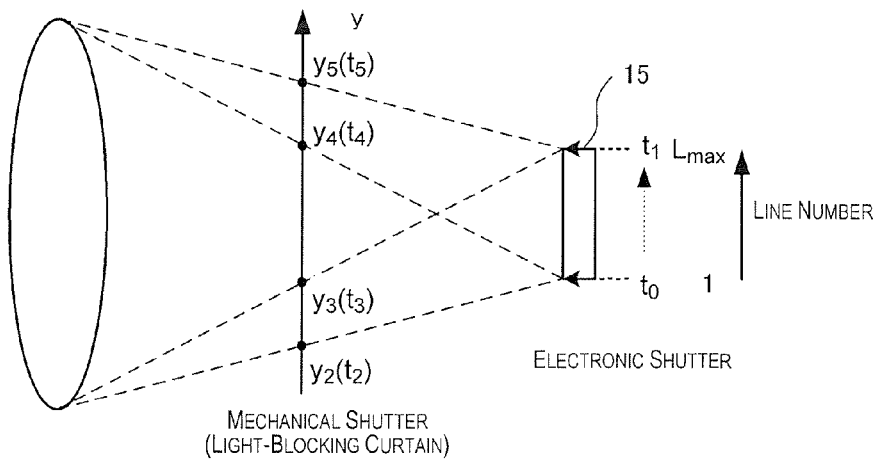
FIGS. 5A to 5C are model diagrams and graphs depicting constriction of a beam of light.

FIG. 5A is a model diagram depicting a beam of captured light blocked by the light-blocking curtain of the mechanical shutter 13. In FIG. 5A, the lens 11, the light-blocking curtain of the mechanical shutter 13, and the area image sensor 15 are depicted viewed from a perpendicular direction to the center optical axis of captured light and the movement direction of the light-blocking curtain. In the present modification example, for simplicity of description, the border B of the exposed region R1 and the light-blocked region R2 is assumed to be always parallel to the lines. The timing X of the electronic shutter is assumed to be brought into complete compliance with the timing Y of the mechanical shutter 13. Specifically, it is supposed that the actual exposure duration AE is equal to the set exposure duration (shutter speed) TE in all of the photoelectric conversion elements.

A time t and an upper end position y of the light-blocking curtain, mentioned below, will be defined here. First, at time t0 and t1, exposure starts for the photoelectric conversion elements belonging to the lowermost and uppermost lines (line numbers 1, Lmax) in the area image sensor 15. The light-blocking curtain of the mechanical shutter 13 then starts to rise, and at a time t2 at which the upper end position y of the light-blocking curtain has reached y2, the lowermost end of the beam focused on the photoelectric conversion elements belonging to the lowermost line is blocked. Next, at time t3 at which the upper end position y of the light-blocking curtain has reached y3, the lowermost end of the beam focused on the photoelectric conversion elements belonging to the uppermost line is blocked. At time t4 at which the upper end position y of the light-blocking curtain has reached y4, the uppermost edge of the beam focused on the photoelectric conversion elements belonging to the lowermost line is blocked. Further, at time t5 at which the upper end position y of the light-blocking curtain has reached y5, the uppermost edge of the beam focused on the photoelectric conversion elements belonging to the uppermost line is blocked. At time t4, the captured light focused on the photoelectric conversion elements belonging to the lowermost line is completely blocked, and exposure of the photoelectric conversion elements belonging to the lowermost line ends. Specifically, the border B of the exposed region R1 and the light-blocked region R2 reaches the lowermost line at time t4. Similarly, the border B of the exposed region R1 and the light-blocked region R2 reaches the uppermost line at time t5, whereupon exposure of the photoelectric conversion elements belonging to the line in question ends.

Figure 5B:
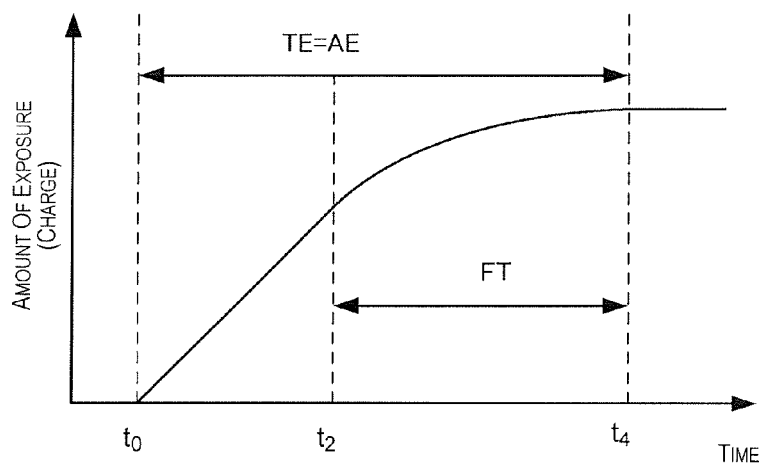

FIG. 5B is a graph depicting the amount of exposure of photoelectric conversion elements belonging to the lowermost line. In FIG. 5B, the vertical axis depicts the amount of exposure, and the horizontal axis depicts time. As depicted in the drawing, the amount of exposure of the photoelectric conversion elements belonging to the lowermost line increases in linear fashion at a predetermined slope from time t0 when exposure of the photoelectric conversion elements belonging to the line in question starts. Then, subsequent to elapse of time t2 at which the lowermost end of the beam focused on the photoelectric conversion elements belonging to the lowermost line is blocked, the beam focused on the photoelectric conversion elements in question progressively constricts and the slope of increase of the amount of exposure begins to decrease. Further, after elapse of time t4 at which the uppermost edge of the beam focused on the photoelectric conversion elements belonging to the lowermost line is blocked, exposure of the photoelectric conversion elements in question ends, and finally the amount of exposure ceases to increase. By readout and quantization of charges proportional to this amount of exposure, tone values depicting the amount of exposure of each pixel of the image-capturing data are determined.

As depicted in FIG. 5B, with increasing length of a constriction exposure duration FT, which is the duration from time t2 when the beam of captured light focused on the lowermost photoelectric conversion elements begins to constrict to time t4 when exposure ends, the amount of exposure of the lowermost photoelectric conversion elements will be smaller. In the present modification example, because the timing X of the electronic shutter has been brought into complete compliance with the timing Y of the mechanical shutter 13, the actual exposure duration AE (t0 to t4) from start to end of exposure of each line is the same for all of the photoelectric conversion elements. However, there are variance among each of the photoelectric conversion elements in terms of the length of the constriction exposure duration FT.

Figure 5C:
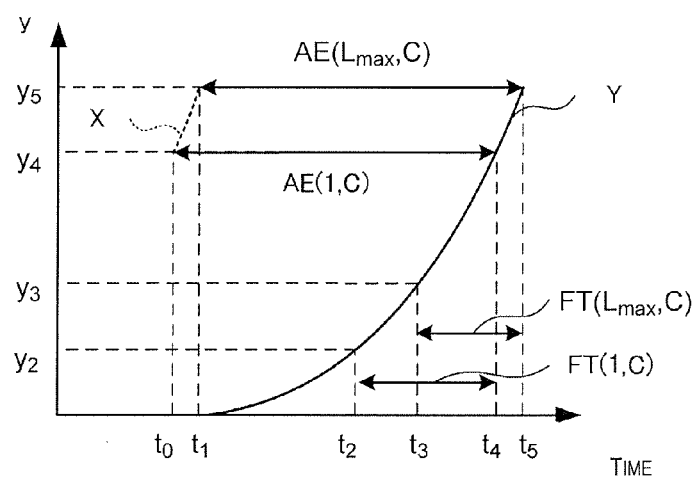

FIG. 5C is a graph depicting a relationship between the constriction exposure duration FT and the upper end position y of the light-blocking curtain. In the drawing, the horizontal axis depicts time t, and the vertical axis depicts the upper end position y. The upper end position y of the light-blocking curtain transitions in parabolic fashion due to uniformly-accelerated movement of the light-blocking curtain. The constriction exposure durations FT for the uppermost and lowermost lines are respectively the interval (t2 to t4) and the interval (t3 to t5), which correspond to intervals during which the upper end position y passes through a zone (y2 to y4.) and a zone (y3 to y5). As depicted in FIG. 5A, because the uppermost and lowermost lines are at vertically symmetrical positions in relation to the center optical axis, the length of the zone (y2 to y4) and the length of the zone (y3 to y5) are equal to one another. However, because the speed of the light-blocking curtain accelerates in linear fashion, the interval (t3 to t5) of passage through the zone (y3 to y5) to the downstream side in the direction of advance of the light-blocking curtain is shorter than the interval (t2 to t4) of passage through the zone (y2 to y4). Specifically, the constriction exposure duration FT for the uppermost line is shorter than the constriction exposure duration FT for the lowermost line. Consequently, the amount of exposure is greater for the uppermost line having the shorter constriction exposure duration FT. Specifically, the constriction characteristics of captured light cause variance in the amount of exposure in a manner reflective of position of photoelectric conversion elements in the vertical direction.

In this way, the constriction exposure duration FT varies in a manner dependent on the zones (y2 to y4), (y3 to y5) of the upper end position y of the light-blocking curtain constricting the beam of captured light which is focused on the photoelectric conversion elements. The length and position of these zones (y2 to y4), (y3 to y5) in the direction of advance of the light-blocking curtain can be identified geometrically on the basis of positional relationships of the lens 11, the light-blocking curtain, and the area image sensor 15 depicted in FIG. 5A. Consequently, it is preferable to minimize variance in the amount of exposure through correction based on the position in the optical axis direction at which the light-blocking curtain of the mechanical shutter 13 blocks the captured light. For example, a greater distance between the light-blocking curtain and the area image sensor 15 means that the light-blocking curtain will constrict the beam of captured light in longer zones (y2 to y4), (y3 to y5), and that therefore the constriction exposure duration FT for the photoelectric conversion elements will be longer. Consequently, for a mechanical shutter 13 having a great distance between the light-blocking curtain and the area image sensor 15, a LUT 53a containing larger values of gain GE can be created. The LUT 53a for correcting the variance in the amount of exposure described above can be created by computations based on the position in the optical axis direction at which the light-blocking curtain of the mechanical shutter 13 blocks the captured light, and on other factors; or the LUT 53a can be created as follows.

In the present modification example, uniform reflected light is captured by capturing a subject having uniform color (e.g., white or another color) with the entire angle of field of the optical system 10 while directing a uniform light source onto the entire subject. The computer which creates the LUT 53a then acquires the image-capturing data from the area image sensor 15. The computer in question now acquires, for each of the RGB channels, a tone value of an amount of exposure corresponding to a predetermined photoelectric conversion element in the image-capturing data in question, designating the tone value in question as a standard tone value. Here, it is preferable to select the photoelectric conversion element with the shortest exposure duration in the area image sensor 15 as the predetermined photoelectric conversion element, so that gain GE is one or greater. An exposure amount proportion is then calculated by dividing the tone value of each pixel of the image-capturing data by the standard tone value of the matching channel; the inverse of the exposure amount proportion in question is calculated as gain GE for the photoelectric conversion element corresponding to the pixel; and a correspondence relationship between the photoelectric conversion element and the gain GE is stored in the LUT 53a. In the above way, because the constriction exposure duration FT for constricted exposure of the beam is dependent on the position of the light-blocking curtain in the optical axis direction, the effect of variance in operating characteristics caused by variance in the position of the light-blocking curtain among individual frames or by manufacturing errors in the mechanical shutter can be compensated for by creating an individual LUT 53a for each image capture device 1 frame. The LUT 53a can be created at the time of manufacture of the image capture device 1, and stored in the ROM 53, for example. According to this method, variance in the amount of exposure caused by the variance in exposure duration described in the aforedescribed embodiment can be minimized. Also, through correction according to the present modification example, both the start and end of exposure are carried out by the mechanical shutter, and variance in the amount of exposure caused by differences in position of the light-blocking curtain in the optical axis direction (differences in constriction characteristics) can be minimized, even in a case where the positions of the mechanical shutter light-blocking curtain in question are different from one another in the optical axis direction. Also, by creating the LUT 53a on a periodic basis, it is possible to compensate for the effect of deterioration over time on the image capture device 1.

(5) Modification Example 3

Hereinabove, it was assumed that the operating characteristics of the mechanical shutter 13 do not change when carrying out capture of actual photographs; however, strictly speaking, the operating characteristics of the mechanical shutter 13 do change in a manner reflective of the operating history of the mechanical shutter 13 prior to carrying out capture. Specifically, in the mechanical shutter 13 of the aforedescribed embodiment, the light-blocking curtain is kept retained through attraction by a permanent magnet when latching of the light-blocking curtain by the latching lever is canceled; in the present modification example, however, during canceling of latching of the light-blocking curtain by the latching lever, an electrical current is supplied to an electromagnet, whereby retention of the light-blocking curtain in opposition to spring force continues due to the magnetic energy of the electromagnet. Then, once an interval corresponding to the exposure duration (shutter speed) TE has elapsed from the start of exposure, supply of the electrical current to the electromagnet is halted and retention of the light-blocking curtain through attraction by the electromagnet is canceled. Because of this, the light-blocking curtain moves due to spring force, and the light-blocking curtain moves to a position entirely blocking the captured light, ending exposure in the photoelectric conversion elements. Ordinarily, in an interval prior to capture, a preview video captured in the area image sensor 15 is viewed in the EVF (the display section 40) or the like while awaiting a chance to trip the shutter. With the mechanical shutter of the present modification example, during the interval in which the preview video is displayed, latching of the light-blocking curtain by the latching lever is canceled, and the light-blocking curtain is retained through attraction by an electromagnet. With a mechanical shutter of this design, the electromagnet reaches high temperature during long preview video display intervals. The responsiveness of the mechanical shutter 13 is diminished due to the high temperature of the electromagnet. Once responsiveness is diminished, the interval from halting of the supply of electrical current to the electromagnet to driving of the light-blocking curtain becomes longer. Consequently, with a longer interval of display of the preview video, the end of exposure will be delayed. Because of this, the exposure amount correction section 20a correcting the amount of exposure tone values with reference to the same LUT 53a irrespective of the interval of display of the preview video gives rise to correction errors.

Accordingly, in the present modification example, the exposure amount correction section 20a acquires from the CPU 50 operating history information depicting the length of the interval for which a preview video was displayed before the shutter button was pressed. Then, on the basis of the operating history information, the exposure amount correction section 20a makes reference to a LUT 53a which corresponds to the length of the preview video display interval, and the exposure amount correction section 20a corrects the tone values of the amount of exposure. In the present modification example, as in the first modification example, a LUT 53a can be created for each of a plurality of preview video display intervals on the basis of image-capturing data of a subject of uniform color. Of course, another approach would be to correct gain GE specified in the LUT 53a in a manner reflective of the preview video display interval, and then carry out correction based on the gain in question. Correction of the amount of exposure can be carried out based on the duration of supplying an electrical current to any electromagnet that participates in operation of the light-blocking curtain. For example, in a mechanical shutter that requires electrical current to be supplied to an electromagnet during shutter preliminary operation (e.g., an operation of holding down the shutter button halfway), correction of the amount of exposure can be carried out based on the duration of the shutter preliminary operation.

(6) Modification Example 4

The responsiveness of the mechanical shutter 13 can be diminished when the electromagnet reaches high temperature due to extended display of a preview video as described above, and the responsiveness of the mechanical shutter 13 can also be diminished in a case where the electromagnet reaches high temperature owing to the image capture device 1 being used at high temperature. Further, in cases where the image capture device 1 is used at high temperature, the characteristics of the spring that pulls the light-blocking curtain can change, not just those of the electromagnet. Further, the characteristics of the spring change with humidity. If the characteristics of the spring change, the movement of the light-blocking curtain changes, and the errors in the exposure duration depicted in the graphs in FIGS. 3A and 3B increase. Further, the characteristics of the spring change with the number of times the spring stretches and contracts (fatigue) and with deterioration over time. For example, deterioration in the elastic force of a spring in association with a greater number of times that the spring stretches and contracts or a longer interval since manufacture can lead to slower acceleration of the light-blocking curtain and to longer exposure duration. Accordingly, in the present modification example, the exposure amount correction section 20a acquires from sensors (not shown) operating environment information depicting the temperature and humidity of the mechanical shutter 13 during pressing of the shutter button, and also acquires from the CPU 50 operating history information depicting the manufacturing date of the image capture device 1 and the number of times the mechanical shutter 13 was operated. Then, on the basis of the operating environment information in question and the operating history information in question, the exposure amount correction section 20a identifies the temperature and humidity of the mechanical shutter 13, the manufacturing date of the image capture device 1, and the number of times the mechanical shutter 13 has been operated; and making reference to a LUT 53a corresponding to a combination of these, corrects the tone values of the amount of exposure. In the present modification example, as in the first modification example, a LUT 53a is created for each of a plurality of combinations of temperature and humidity of the mechanical shutter 13, manufacturing date of the image capture device 1, and number of times the mechanical shutter 13 has been operated, on the basis of image-capturing data of a subject of uniform color. Discrepancy correction processing can also be carried out in contemplation of information that affects operation of the mechanical shutter 13, besides the temperature and humidity of the mechanical shutter 13, the manufacturing date of the image capture device 1, and the number of times the mechanical shutter 13 has been operated. Another approach would be for the exposure amount correction section 20a to correct a basic LUT on the basis of information affecting operation of the mechanical shutter 13 in order to generate a LUT 53a, and to then carry out discrepancy correction processing.

(7) Modification Example 5

Figure 6:
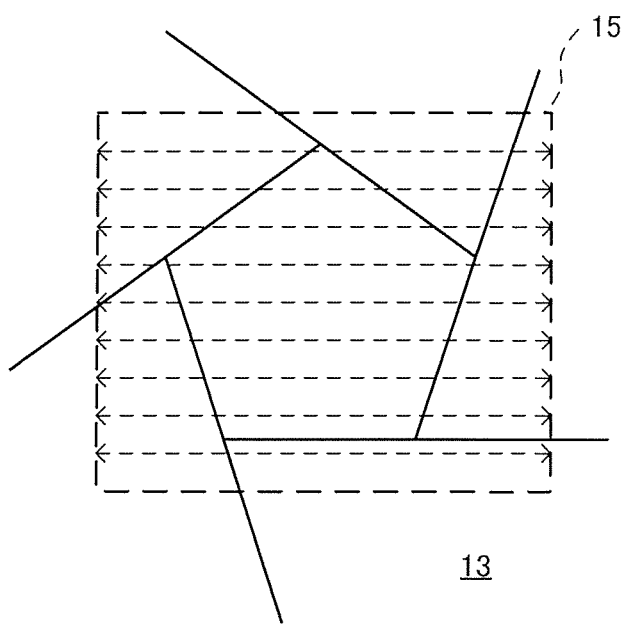
FIG. 6 is a model diagram of an area image sensor and a light-blocking curtain.

FIG. 6 is a model diagram depicting a light-blocking curtain of a mechanical shutter 13, and an area image sensor 15 according to the present modification example. In the present modification example, the mechanical shutter 13 employs an aperture shutter design in which the light-blocking curtain is composed of five aperture blades, the five aperture blades being driven so as to constrict an optical path toward the center optical axis. The number of aperture blades is not limited to five, and can be some other number such as two or three. The light-blocking curtain of the mechanical shutter 13 can be furnished between the area image sensor 15 and the lens 11, furnished between any of a plurality of lenses constituting the lens 11, or furnished to the upstream side of the lens 11 on the optical path. In this sort of aperture shutter design, the border B of the exposed region R1 and the light-blocked region R2 forms a circumscribing pentagon of a circle centered on the center optical axis, with each side of the circumscribing pentagon in question intersecting lines of the area image sensor 15 (illustrated by broken line arrows). Also, this sort of aperture shutter design has the characteristic that the border B of the exposed region R1 and the light-blocked region R2 reaches photoelectric conversion elements closer to the optical axis center later, and the timing of ending exposure thereof is later. On the other hand, because the direction of the lines of the area image sensor 15 is the horizontal direction, even if the timing for starting exposure of the photoelectric conversion elements is adjusted in line units, this timing cannot be brought into compliance with the timing of the mechanical shutter 13. In this case as well, variance in the amount of exposure can be minimized by correcting tone values of the amount of exposure in image-capturing data in a manner reflective of the positions of the photoelectric conversion elements.

(8) Modification Example 6

Figure 7:
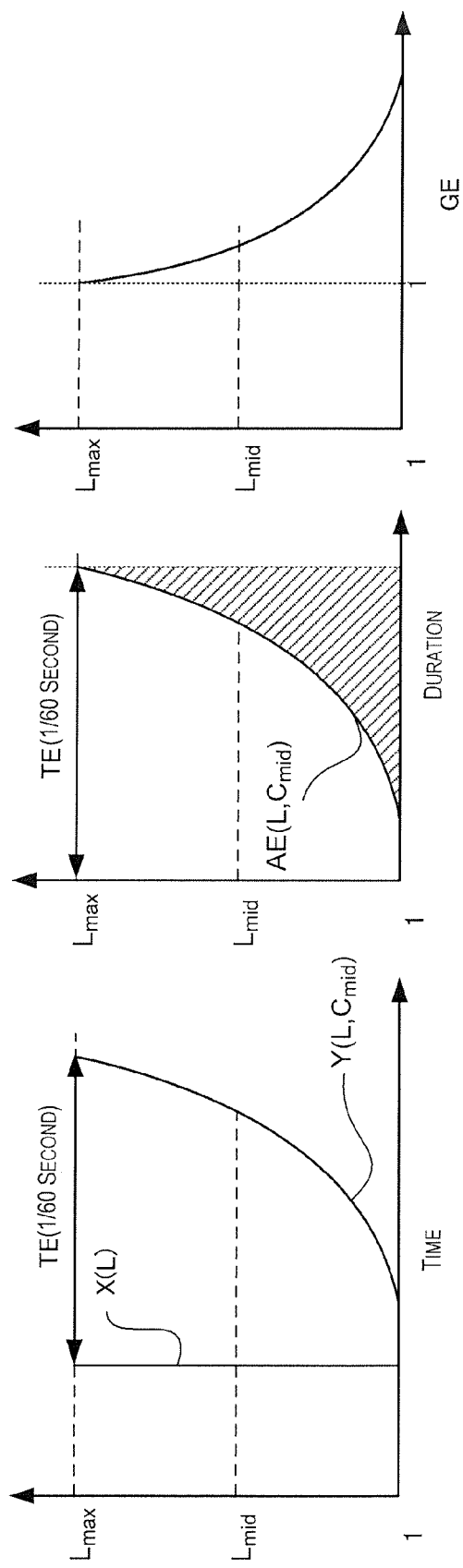
FIG. 7 is a graph depicting timing of exposure.

The left graph of FIG. 7 is a graph depicting timing of exposure in the area image sensor 15 of the present modification example. In the present modification example, the electronic shutter controller 30a1 does not bring the timing X of the electronic shutter into compliance with the timing Y of the mechanical shutter 13. Specifically, as depicted by the left graph of FIG. 7, resetting of charge is carried out simultaneously in all of the photoelectric conversion elements belonging to all of the lines, and accumulation of charges starts simultaneously in all of the photoelectric conversion elements (a global shutter is carried out), so that exposure starts simultaneously in all of the photoelectric conversion elements. In the example of the left graph of FIG. 7, the actual exposure duration AE(Lmax, Cmid) in the photoelectric conversion elements at the horizontal center of the uppermost line (line number Lmax) is made to coincide with the set exposure duration (shutter speed) TE. In this case, particularly in the lower lines, owing to a large difference between the timing X of the electronic shutter and the timing Y of the mechanical shutter 13, there are large variance in the actual exposure duration AE from the set exposure duration (shutter speed) TE as shown by the graph in FIG. 7.

Particularly in the lower lines, the actual exposure duration AE is appreciably shorter than the set exposure duration (shutter speed) TE.

In the present modification example as well, the set exposure duration (shutter speed) TE is divided by the actual exposure duration AE to derive gain GE as depicted by the right graph of FIG. 7. The gain GE in question is then associated with each photoelectric conversion element and stored in the LUT 53a; and the exposure amount correction section 20a, making reference to the LUT 53a, multiplies gain GE of the photoelectric conversion element corresponding to each pixel by the tone value of the amount of exposure of each pixel in the image-capturing data. In the present modification example, lines for which the actual exposure duration AE is appreciably shorter than the set exposure duration (shutter speed) TE are produced, but through multiplication by gain GE which is appreciably greater than one for these lines, variance in the amount of exposure can be minimized, although noise is amplified. Specifically, where correction is carried out by multiplying tone values depicting the amount of exposure by gain GE as taught in the present invention, variance in the amount of exposure can be minimized, even without controlling the timing X of the electronic shutter so as to be in compliance with the timing Y of the mechanical shutter 13. Consequently, the scale of the circuitry of the electronic shutter controller 30a1 can be reduced without significantly degrading the quality of captured images. Particularly in cases of long exposure duration (shutter speed) TE, the effect of variance in the amount of exposure is small, and noise tends not to be amplified even if discrepancy correction is carried out. Because of this, for longer exposure durations (shutter speeds) TE, the number of segments of the polygonal curve for the electronic shutter timing X can be reduced; or if the exposure duration (shutter speed) TE is longer than a fixed duration, a global shutter can be carried out. Therefore, control of the electronic shutter is easy in cases of long exposure duration (shutter speed) TE.

(9) Modification Example 7

Figure 8:
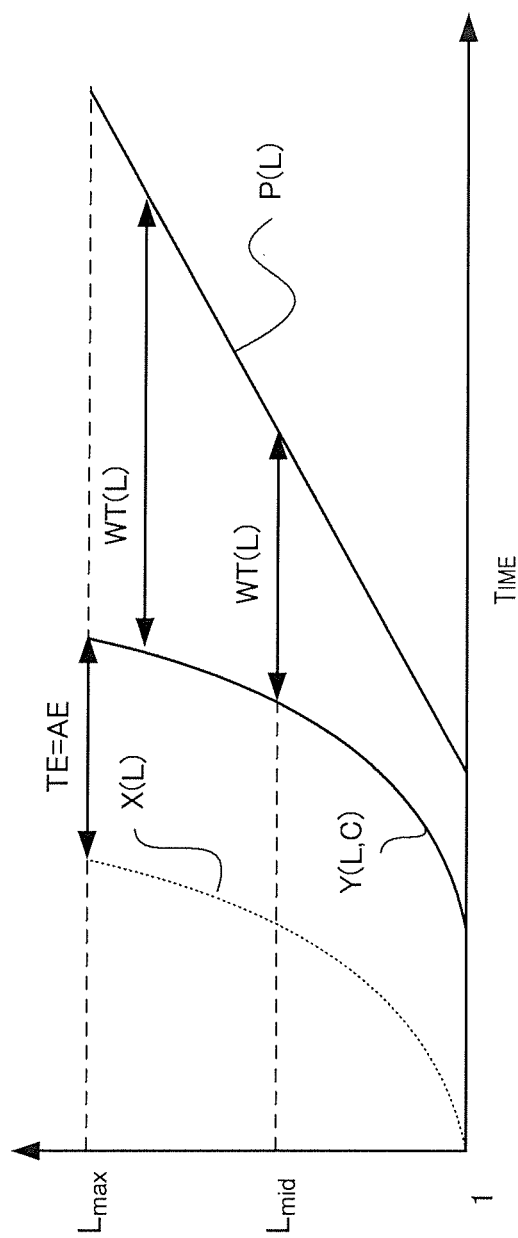
FIG. 8 is a graph depicting timing for reading out image-capturing data.

FIG. 8 is a graph depicting the timing for readout of image-capturing data and for exposure in the photoelectric conversion elements of each line. In the example of FIG. 8, as in the aforedescribed Modification Example 1, it is assumed that the timing X of the electronic shutter has been brought into complete compliance with the timing Y of the mechanical shutter 13, and that blocking of light by the mechanical shutter 13 is carried out parallel to the lines. Consequently, the actual exposure duration AE in the photoelectric conversion elements is made to coincide with the set exposure duration (shutter speed) TE. In FIG. 8, a timing P(L) that depicts timing for readout of image-capturing data from each line is depicted by a broken line. Because there are a multitude of photoelectric conversion elements in a line, the interval necessary for reading out the image-capturing data from the line will be longer than the interval of passage of the border B through the line by the mechanical shutter 13. Consequently, the timing P(L) for readout of image-capturing data has a more gentle slope than the timing X, Y for starting and ending exposure of the photoelectric conversion elements of the line. Consequently, a wait interval WT(L) from the end of exposure to readout of image-capturing data in the photoelectric conversion elements increases in length with increasing line number. During this wait interval WT(L), despite blocking of light to the photoelectric conversion elements by the light-blocking curtain of the mechanical shutter 13, the amount of charge accumulation N(L) due to dark current noise of the area image sensor 15 increases as the wait interval WT(L) becomes longer. Specifically, variance in the amount of exposure arise in photoelectric conversion elements, caused by non-uniformity of the wait interval WT(L), which in turn is caused by differences between the timing Y of the mechanical shutter 13 and the timing P(L) for readout of image-capturing data. In the present modification example, because the amount of exposure attributable to the dark current component is greater for lines closer to the top, prior to carrying out discrepancy correction processing, the image data generation section 20 carries out optical black correction of the image-capturing data to subtract values N(L) representing an increasing noise component from the tone values of the amount of exposure for lines closer to the top, to thereby minimize variance in the amount of exposure caused by non-uniformity of the wait interval WT(L).

(10) Modification Example 8

While examples of correction of the images with the image capture device 1 were described above, the images can be corrected with a device other than the image capture device 1. For example, the image capture device 1 can be provided with a mode in which image-capturing data captured by the area image sensor 15 is recorded in raw form to the removable memory 56, without undergoing the various kinds of image processing by the image data generation section 20. The image capture device 1 can append to the image-capturing data appended information that identifies the model of the image capture device 1 or the exposure duration (shutter speed) at the time of capture. In the present modification example, discrepancy correction processing of the amount of exposure is executed in a computer that is capable of loading the above-described image-capturing data from the removable memory 56. The timing Y of the mechanical shutter 13 differs considerably among each of the models of the image capture device 1 having physically different shutter mechanisms. Consequently, in the present modification example, a LUT 53a is created for each of the models of the image capture device 1, and these are recorded to the computer before carrying out discrepancy correction processing. These LUT 53a can be recorded during installation of the program for carrying out discrepancy correction processing on the computer, or acquired externally and recorded to the computer after installation. Then, when the computer loads the image-capturing data, it refers to the LUT 53a that corresponds to the model of the image capture device 1 identified by the appended information appended to the image-capturing data in question, and corrects the tone values of the amount of exposure associated with the pixels of the image-capturing data in question. Alternatively, a LUT that is reflective of the exposure duration (shutter speed) at the time of capture can be appended to the image-capturing data. In this case, in contrast to the case where no LUT has been appended, when correcting the tone values of the amount of exposure associated with the pixels of the image-capturing data in question, reference will be made to that LUT.

(11) Modification Example 9

As will be appreciated from comparison of the graphs in FIGS. 3A and 3B, where the operating characteristics of the electronic shutter are constant, the effect on the amount of exposure by errors between the actual exposure duration AE and the set exposure duration (shutter speed) TE will be smaller with greater length of the set exposure duration (shutter speed) TE; and gain GE for minimizing the effect of the error in question will be a value approximating one. Further, with a greater set exposure duration (shutter speed) TE, variance in the amount of exposure attributable to error between the actual exposure duration AE and the set exposure duration (shutter speed) TE are less noticeable when the image is viewed. Consequently, an arrangement whereby the exposure amount correction section 20a does not carry out correction in cases where the set exposure duration (shutter speed) TE is longer than a predetermined threshold value is also acceptable. For example, in cases where the relative ratio of the maximum value of the absolute value of error between the actual exposure duration AE and the set exposure duration (shutter speed) TE to the set exposure duration (shutter speed)

TE is equal to or less than a predetermined threshold value (e.g., $\frac{1}{250}$, and so on), variance in the amount of exposure tend not to be noticeable, and correction need not be carried out.

The specific modes of the present invention are not limited to the above-described embodiments and modification examples; the embodiments and modification examples can be combined, and modifications are possible within the scope of the technical idea of the present invention.

The entire disclosure of Japanese Patent Application No. 2010-211696, filed Sep. 22, 2010 is incorporated by reference herein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image capture device for capturing an image of an object, comprising:
   a plurality of photoelectric conversion elements configured to output a signal corresponding to the image based on an amount of exposure between a first shutter operation for starting exposure and a second shutter operation for ending exposure;
   a controller configured to control the first shutter operation and the second shutter operation; and
   an image generation section configured to correct the signal, and to generate an output image corresponding to the signal after being corrected,
   the image generation section configured to correct the signal based on variance in exposure duration among the plurality of photoelectric conversion elements between the first shutter operation and the second shutter operation,
   the image generation section configured to set a value of gain to be 1 or greater for all regions of the plurality of photoelectric conversion elements which are exposed between the first and the second shutter operations, for correction in image processing with image data for each of the regions, the image data output from the plurality photoelectric conversion elements.

2. The image capture device according to claim 1, wherein the plurality of photoelectric conversion elements include a first photoelectric conversion element and a second photoelectric conversion element having the exposure duration longer than the first photoelectric conversion element, and
if the signal has uniform brightness in light emission, amount of correcting the signal at the first photoelectric conversion element is greater than amount of correcting the signal at the second photoelectric conversion element.

3. The image capture device according to claim 1, wherein the image generation section is configured to correct the signal based on the variance in the exposure duration within a range of amount of correction within which signal about the plurality of photoelectric conversion elements are not decreased.

4. The image capture device according to claim 1, wherein the first shutter operation is by an electronic shutter, and the second shutter operation is by a mechanical shutter.

5. The image capture device according to claim 1, wherein the plurality of photoelectric conversion elements include first and second photoelectric conversion elements, and
if the first and second photoelectric conversion elements start receiving exposure and end in different timing, amount of correcting for the first photoelectric conversion element is different from amount of correcting for the second photoelectric conversion element.

6. The image capture device according to claim 1, wherein the controller is configured to control the second shutter operation by a mechanical shutter,
the plurality of photoelectric conversion elements have a light-receiving surface, and
the image generation section is configured to correct the signal based on a distance between the mechanical shutter and the light-receiving surface in a direction of an optical axis extending from the object to the plurality of photoelectric conversion elements.

7. The image capture device according to claim 1, wherein the controller is configured to control the first shutter operation and the second shutter operation on the basis of a prescribed shutter speed, and
the image generation section is configured to correct the signal by using a coefficient on the basis of the shutter speed.

8. The image capture device according to claim 1, wherein at least one of the first shutter operation and the second shutter operation is performed by a mechanical shutter, and
the image generation section is configured to acquire at least one of operating history information and operating environment information of the mechanical shutter at a time of capturing the image, and to correct the signal on the basis of at least one of the operating history information and the operating environment information.

9. The image capture device according to claim 1, wherein the image generation section is configured to correct the signal by at least one of an optical black correction, a color conversion processing, a sharpness adjustment, a noise removal, a gamma correction, and a resizing processing.

10. The image capture device according to claim 1, wherein the image generation section is configured to correct the variance in the exposure duration except in a vertical direction.

11. An image correction circuit, comprising:
an image acquisition section configured to acquire a signal corresponding to an image of an object by using a first shutter operation for starting exposure of a plurality of photoelectric conversion elements and a second shutter operation for ending exposure of the plurality of photoelectric conversion elements; and
a correction section configured to correct the signal,
the correction section configured to correct the signal based on variance in exposure duration among the plurality of photoelectric conversion elements between the first shutter operation and the second shutter operation,
the correction section configured to set a value of gain to be 1 or greater for all regions of the plurality of photoelectric conversion elements which are exposed in image processing with image data for each of the regions, the image data output from the plurality photoelectric conversion elements.

12. The image correction circuit according to claim 11, wherein
the plurality of photoelectric conversion elements include a first photoelectric conversion element and a second photoelectric conversion having the exposure duration longer than the first photoelectric conversion element,
the correction section configured to correct the signal more by the first photoelectric conversion element than by the second photoelectric element.

13. The image correction device according to claim 11, wherein
the correction section configured to correct the signal based on variance in exposure duration within a range of amount of correction within which that signal about the plurality of photoelectric conversion elements are not decreased.

14. The image correction circuit according to claim 11, wherein
the image acquisition section is configured to acquire the signal by using an electronic shutter for the first shutter operation, and a mechanical shutter for the second shutter operation.

15. The image correction circuit according to claim 11, wherein
the plurality of photoelectric conversion elements include first and second photoelectric conversion elements, and
if the first and second photoelectric conversion element start receiving exposure and end in different timing, amount of correcting for the first photoelectric conversion element is different from amount of correcting for the second photoelectric conversion element.

16. The image correction circuit according to claim 11, wherein
the second shutter operation is performed by a mechanical shutter,
the plurality of photoelectric conversion elements have a light-receiving surface, and
the image generation section is configured to correct the signal based on a distance between the mechanical shutter and the light-receiving surface in a direction of an optical axis extending from the object to the plurality of photoelectric conversion elements.

17. The image correction circuit according to claim 11, wherein
the correction section is configured to correct the signal based on a prescribed shutter speed.

18. The image correction circuit according to claim 11, wherein
at least one of the first shutter operation and the second shutter operation is performed by a mechanical shutter, and
the correction section is configured to acquire at least one of operating history information and operating environment information of the mechanical shutter at a time of capturing the image, and to correct the signal on the basis of at least one of the operating history information and the operating environment information.

19. The image correction circuit according to claim 11, wherein
the image generation section is configured to correct the signal by at least one from a group consisting of an optical black correction, a color conversion processing, a sharpness adjustment, a noise removal, a gamma correction, and a resizing processing.

20. An image capture device for acquiring a signal corresponding to an image of an object, comprising:
a plurality of photoelectric conversion elements configured to output the signal on the basis of an amount of exposure;
a mechanical shutter configured to at least one of starting and ending of the exposure; and
an image generation section configured to correct the signal based on variance in exposure duration among the plurality photoelectric conversion elements by using at least the mechanical shutter, and based on the signal output by the plurality of photoelectric conversion elements exposed by using at least the mechanical shutter, the image generation section configured to generate an output image corresponding to the signal after being corrected,
the image generation section configured to set a value of gain to be 1 or greater for all regions of the plurality of photoelectric conversion elements which are exposed between the first and the second shutter operations, for correction in image processing with image data for each of the regions, the image data output from the plurality of photoelectric conversion elements.

* * * * *